United States Patent [19]

Wallace

[11] Patent Number: 4,508,759
[45] Date of Patent: * Apr. 2, 1985

[54] METHOD AND APPARATUS FOR MAKING FRICTION LOCKING THREADED FASTENERS

[75] Inventor: Richard B. Wallace, Bloomfield Hills, Mich.

[73] Assignee: The Oakland Corporation, Troy, Mich.

[*] Notice: The portion of the term of this patent subsequent to Jan. 31, 2001 has been disclaimed.

[21] Appl. No.: 456,569

[22] Filed: Jan. 10, 1983

Related U.S. Application Data

[63] Continuation-in-part of Ser. No. 376,764, May 10, 1982, Pat. No. 4,428,981.

[51] Int. Cl.³ .............................................. B05D 1/12
[52] U.S. Cl. .................................... 427/195; 427/197; 427/202; 118/308; 118/310; 118/316; 118/322; 411/1; 411/301; 411/258; 411/903; 10/10 P; 10/10 R
[58] Field of Search ............... 427/195, 425, 197, 202; 411/1, 301, 258, 903; 10/10 P, 10 R; 118/308, 310, 316, 322

[56] References Cited

U.S. PATENT DOCUMENTS

| 3,452,714 | 7/1969 | Burke et al. ................. 118/308 X |
| 3,579,684 | 5/1971 | Duffy ................................ 427/195 |
| 3,677,801 | 7/1972 | Hardy ............................. 118/233 X |
| 3,974,306 | 8/1976 | Inamura et al. ................. 427/181 |
| 4,223,632 | 9/1980 | Cadwallader ............... 427/195 X |
| 4,428,981 | 1/1984 | Wallace .......................... 427/195 |

*Primary Examiner*—Shrive P. Beck
*Attorney, Agent, or Firm*—Barnes, Kisselle, Raisch, Choate, Whittemore & Hulbert

[57] ABSTRACT

A threaded fastener having an annular ring of yieldable friction material in the thread grooves thereof and bonded to the sides of the threads, in which the material is of substantially uniform thickness on the sides of the threads from adjacent the root to adjacent the crest thereof. In an embodiment of the invention two more adjacent but axially separated rings of friction material are provided, the annular zone or zones between adjacent rings having much less or substantially no friction material. In another embodiment, the friction material is applied primarily to the non-load bearing side of the threads in the ring.

11 Claims, 10 Drawing Figures

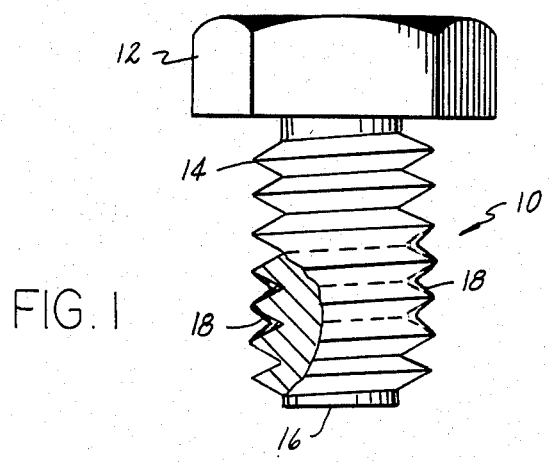
FIG. 1
FIG. 1A
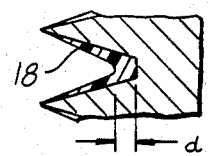
FIG. 3
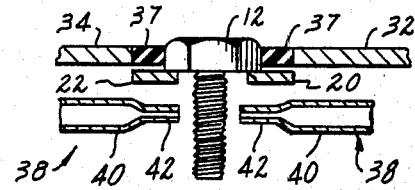
FIG. 2
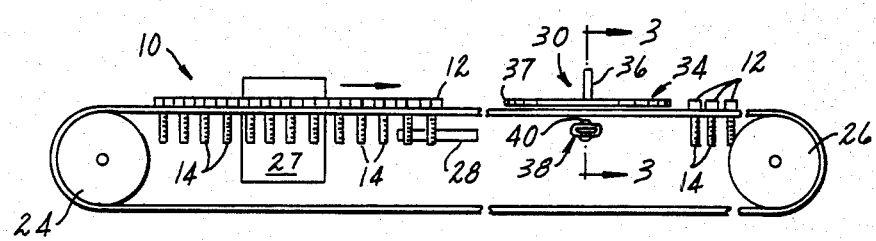
FIG. 4
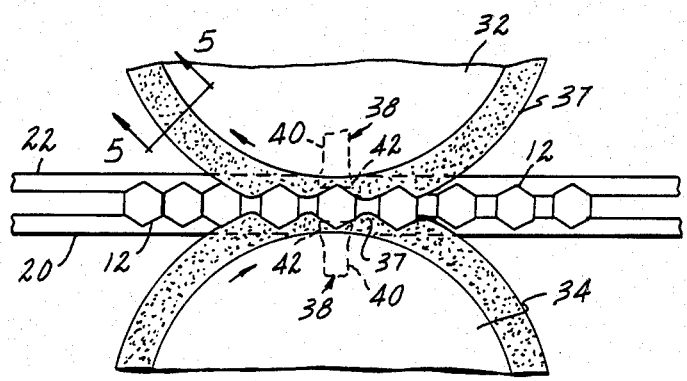
FIG. 5
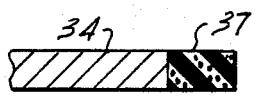
FIG. 6
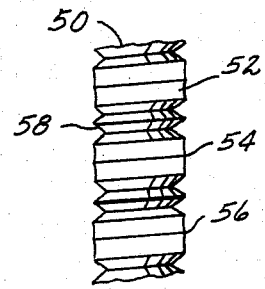
FIG. 7
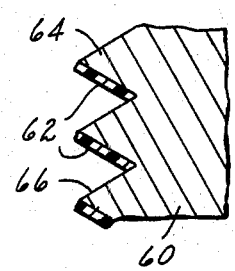
FIG. 8
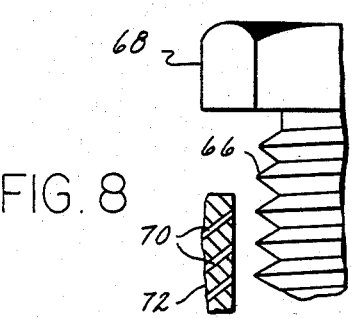
FIG. 9
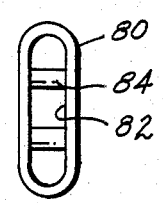

METHOD AND APPARATUS FOR MAKING FRICTION LOCKING THREADED FASTENERS

CROSS REFERENCE TO RELATED APPLICATIONS

The present invention is a continuation-in-part of my co-pending application Ser. No. 376,764, filed May 10, 1982, now U.S. Pat. No. 4,428,981.

STATE OF THE ART

The use of a yieldable friction material, such as polymerized resin, acting between opposed thread surfaces of mated threaded fasteners has long been known and at present has developed into the basis for very substantial commercial activity.

From the outset, while many materials have been tested or used, the material gaining the most widespread acceptance is a nylon polymer, typically nylon 6 or 11.

Early patents disclosing this concept were Boots U.S. Pat. No. 2,462,603 and Brutus U.S. Pat. No. 2,520,127, both filed in the 1940's, in which nylon plugs or pellets were seated in holes or recesses formed in the thread surface of one fastener and extending into interfering relation with threads of a mating fastener.

In 1950 Villo U.S. Pat. No. 3,093,177 disclosed a nylon member applied to a local area of an unmodified thread form by heat and pressure, thus eliminating the necessity for drilling or otherwise forming a hole or recess for receiving the nylon pellet.

A significant development in this art is illustrated by James U.S. Pat. No. 2,928,446, filed in the mid 1950's. This patent discloses a resin deposit preferably a vinyl tripolymer, applied as a liquid solution and dried. The liquid is applied while the threaded fastener (a stud) is rotated so that the deposit extends around 360°, and is spaced from the end of the stud to facilitate initial engagement.

In the 1960's, patent applications were filed resulting in U.S. Pat. Nos. 3,294,139 (Preziosi), 3,416,492 (Greenleaf) and Burke, et al., 3,452,714, all of which taught the formation of a friction deposit by melting or fusing a thermoplastic resin (nylon) powder onto the threaded portion of a fastener. Preziosi deposited the powder on a fastener and subsequently heated the assembly to melt the resin. Greenleaf and Burke formed the deposit by directing the thermoplastic resin powder onto a fastener previously or concurrently heated to resin fusion temperature. Both suggested forming an arcuate deposit extending completely around the fastener.

BRIEF SUMMARY OF THE INVENTION

In accordance with one aspect of the present invention the previously known method is modified primarily by positively rotating the fasteners at a substantial speed as they traverse the particle deposit zone.

The particles may be applied from one side of the line of advancing fasteners, or the streams of particles may be directed from opposite sides.

The stream of thermoplastic particles is conveniently formed by an air flow through a tubular supply conduit, one end of which may be flattened to form an elongated discharge nozzle at the end of the tube. This nozzle projects the stream of air borne particles in a thin fan-shaped form. Where the elongation of the slot is parallel to the direction of advance of the fasteners it defines an elongated zone of deposition which is of limited vertical dimension. The nozzle may be adjusted about the horizontal axis of the tube, and control the horizontal dimension of the zone in the direction of advance of the fasteners, as well as its vertical dimension, which controls the dimension of the deposit of particles axially of the fastener, or the width of the ring of friction material.

It will be appreciated that the deposit of particles may also be controlled by varying the speed of spin or rotation of the fasteners, by varying the rate of advance of the fasteners through the application zones, and by controlling the quantity shape and dimension of the spray which the nozzle emits.

One of the difficulties which has been troublesome in the method as practiced in the past is the relatively high temperature necessary to fuse the particles at the outer surface of the deposit, since the heat for this purpose is required to traverse the thickness of the deposit. During application of the particles, the source of the heat necessary to fuse the particles is of course limited to the previously heated thread surfaces. As a result of this it was necessary to heat the fastening elements, or the threaded portions thereof, to a temperature substantially above the fusion temperature of the thermoplastic material. Where the thermoplastic material is nylon having a fusion temperature of approximately 400° F., it was often necessary to heat the fastener to a temperature of as high as 650° F. to ensure that the particles at the surface of the deposit are properly fused together. This temperature besides being wasteful of energy damages certain metallic coatings commonly provided on threaded members, such for example as zinc coatings, as well as the resin.

In the present invention the deposit of thermoplastic particles is built up in sequentially applied applications. Accordingly each application of particles is fused or at least substantially fused prior to the succeeding application. While the variables above referred to may be controlled to produce a multiplicity of sequentially applied deposits, the advantages of the present invention are realized when the length of the application zone, the rate of advance, and the rate of spin are correlated such as to produce a deposit extending completely around the fastener. It is contemplated that as many as ten applications may be provided.

Since the coating of particles deposited at each passage is very thin, the particles are more completely fused before the next application, and a completely fused mass of nylon is obtained with a much lower temperature of the fastener.

A feature of the present invention is the preliminary heating of the fasteners as for example in economic gas-fired furnaces. The fasteners may be brought to a temperature of 200°-300° F. which reduces the energy required to raise the threaded surfaces to the required fusion temperature. Final heating may conveniently be accomplished by flameless heating, such for example as by induction heating.

While the use of gas-fired heaters alone is not to be excluded, it is preferable to avoid flame producing heaters immediately adjacent the particle application zone, to avoid the possibility of igniting the powder spray.

Significant advantages of forming the deposits of friction material in a continuous ring or band extending completely around the fastener are realized. In the first place, the deposit need have only approximately a small fraction (5-15%) of the radial dimension or depth of a localized patch at one side of the fastener. This is in part because the localized patch must take up the sum of the radial clearance existing at both sides of the fastener, with respect to a mating threaded member. The ring patch, acting at all diametrically related zones, is required to take up only the radial clearance existing at one side between concentric mating threaded fasteners. Secondly, the ring patch is most efficient to provide a seal between the mated threaded fasteners. Finally, the frictional resistance to turning is effective throughout the complete 360° zone.

The apparatus for carrying out the method as described in the foregoing comprises essentially the provision of a pair of relatively larger diameter wheels having soft compressible tires or rims engageable with the heads of the fasteners as they advance into the particle application zone. These wheels are driven so that the surfaces engaging opposite sides of the bolt head move in opposite directions so as to produce relatively rapid rotation or spinning of the fasteners on their own axes as they traverse the application zone. The rate of advance of the individual fasteners through the zone is controlled by selecting differential rates of rotation of the wheels.

It is noted that the fasteners may normally be advanced by the flexible belts with hexagonal heads of the fasteners in abutment. The differential rates of rotation of the wheels is selected such that the fasteners advance through the application zone at a rate somewhat greater than the rate at which they are advanced by the belts. This separates the heads of the bolts for non-interfering rotation as they traverse the particle application zone.

The wheels are positioned above the belt in position to engage the sides of the heads of the fasteners, which remain supported vertically by the flexible belts.

BRIEF DESCRIPTION OF THE DRAWINGS

FIG. 1 is an elevational view of a fastener produced by the present method.

FIG. 1A is an enlarged detail of a single thread groove.

FIG. 2 is a diagrammatic elevational view of the apparatus.

FIG. 3 is a fragmentary enlarged sectional view on the line 3—3, FIG. 2.

FIG. 4 is an enlarged plan view of the apparatus at the application shown.

FIG. 5 is an enlarged sectional view on the line 5—5, FIG. 4.

FIG. 6 is a diagrammatic illustration of generally axially separated bands of friction material.

FIG. 7 is a fragmentary enlarged view of a deposit only on the non-load bearing thread surface.

FIG. 8 is a diagrammatic view of application of friction material to only the non-load bearing thread surfaces.

FIG. 9 shows a modified spray nozzle.

DETAILED DESCRIPTION

The present invention is concerned with the production of externally threaded fasteners provided with friction material effective to retain the threaded fasteners in engagement with mating fastening parts. As illustrated in FIG. 1 an example of such a fastener is a bolt 10 having a hexagonal head 12 and a threaded shank 14. At an annular zone spaced both from the head 12 and the end 16 of the bolt there is a deposit 18 of friction material which as seen in FIG. 1 may fill the bottoms of the thread spaces of the threaded shank and this material as will subsequently be described, is applied by directing a stream of particles of thermoplastic friction material such as nylon against the heated threaded surfaces of the fasteners while the fastener is rotated to cause the deposit of particles to be built up in a successive series of applications. While the friction material is applied in the form of a powder or relatively fine particles, the temperature of the thread surfaces onto which the thermoplastic material is directed is sufficient to produce fusion of the particles. This not only provides a fused bond between the deposit and the thread surfaces but it also causes the deposit to become in effect a solid continuous body in the thread groove. In practice the final deposit presents an outwardly concave surface in a direction traverse to the thread groove, and the depth of the deposit is such that its radial dimension measured from the bottom of the thread groove is only a small fraction of the thread height as measured from root to the crest of the thread.

In fact, in accordance with the present invention, and as best seen in FIG. 1A, the radial dimension of the mid-portion of the resin deposit 18 as measured from the bottom of the thread groove is indicated at d and is 5–15% of the full depth of the thread groove. Since this deposit is built up of a plurality of sequential applications, it is considered more accurate to describe the deposit as of approximately uniform thickness on the thread flanks.

A significant difference in the operation of an annular deposit of 360° to form a ring or band as compared to a deposit located at one side of the fastener will now be considered.

Where the deposit is localized at one side of the fastener, it will be apparent that the initial engagement between the fasteners at the zone occupied by the local patch or deposit results in a relative lateral displacement, bringing the threads into metal-to-metal contact at the zone 180° from the center of the deposit. At this time, in the absence of axial loading, the thread portions in the zone of the deposit are generally centered between adjacent threads on which the resin deposit appears. At the opposite side, the metal-to-metal thread contact occurs at both sides of the threads.

The deposited resin as disclosed herein is yieldable, but it is essentially incompressible and accordingly is displaced as required by the relative massive forces developed by subjecting the fasteners to the axial load for which they are designed. It will be understood also that there may be widely differing clearance between mating threads, and this clearance does not occupy the same locations with different thread types. For example, root clearance may vary widely.

When the fasteners having the localized resin deposits at one side of the fastener come under load, the resin is initially substantially evenly divided between both sides of each thread in the zone of the deposit as determined by the full metal-to-metal contact between threads at the zone opposite the deposit. Under load however, axial displacement of the flowable resin is required. This displacement results in flow which is partly circumferential, distributing the resin laterally beyond the edges of the local deposit. This circumferential displacement is not symmetrical since the relative rotation between the fasteners carries more of the material in the direction of rotation of the untreated fastener. There is however some reverse flow, depending on the amount of resin deposit and the geometry of the threads.

In addition there is a flow of resin axially, across the crests of the threads, from the decreasing thread space between the thread flanks which sustain the loading into the increasing thread space at the other sides of the threads.

As the loading displaces resin from between load bearing thread surfaces, the fasteners tend to resume a concentric relationship, with substantially solid metal-to-metal contact, or the equivalent thereof, around the full 360°.

Under these conditions a substantial excess of resin in the deposit is readily accepted, since the material is displaced ahead of the female fastener, displaced circumferentially beyond the original side edges of the deposit, and, under load, is displaced axially across the thread crests into the thread spaces between unloaded thread surfaces.

The situation existing when the resin deposit extends completely and uniformly around the treated fastener is quite different. In this case, initial engagement between the threads in the deposit zone leaves the fasteners in concentric relation, with substantially equal thickness of resin deposit at both sides of the threads, prior to axial loading.

Under axial loading, there is no unoccupied clearance space for circumferential displacement of resin, and after the spaces between thread crests and adjacent thread roots are filled, the only available space to accommodate material displaced from the spaces between loaded thread surfaces is across the thread crests into the enlarging spaces between the non-load bearing thread surfaces. Under the axial loading normally anticipated, the friction material is nearly completely displaced to provide essentially solid metal to metal abutment between the loaded thread flanks around 360° of the fasteners.

At the same time, frictional opposition to loosening of the fasteners is uniform throughout the entire 360° and the concentric fastener relationship is maintained.

A high production method of producing threaded friction fasteners 10 is illustrated in FIGS. 2–5.

Referring to these figures, the threaded fasteners are advanced with the threaded shanks 14 extending vertically downwardly and the heads 12 supported on flexible belts 20 and 22. Belts 20 and 22 may conveniently be formed of metal and are advanced by rollers 24 and 26. Intermediate lengths of the belts 20 and 22 may be supported by suitable means not shown so that the series of bolts 10 are advanced horizontally as for example to the right as seen in FIG. 2.

As previously noted, the fasteners 10 may advantageously be heated to elevated temperatures somewhat less than required to produce fusion of the subsequently applied particles of thermoplastic material before final heating. This may be accomplished by passing the fasteners through a gas-fired preliminary heater 27. As the fasteners 10 are further advanced by the belts 20 and 22 they traverse a final heating station indicated diagrammatically at 28 which may conveniently be induction heating apparatus. The heaters are capable of accurate control so as to raise the temperature of the threaded shanks of the fasteners to the minimum temperature required to produce fusion throughout of the deposit of particles of thermoplastic material. The preliminary heating of the fasteners in economic gas-fired furnaces substantially reduces the load of the induction heater.

It will be understood that the induction heaters may be located at one or both sides of the line of advancing fasteners as required.

Immediately after the fasteners are brought to the required minimum temperature for producing uniform fusion of the thermoplastic particles into a continuous condition, the belts advance the heated fasteners to the particle application zone indicated generally at 30 in FIG. 2. In this zone, as more clearly seen in FIG. 4, there are provided two rotating wheels 32 and 34 positioned by rotating spindles 36 extending vertically and supporting the wheels for rotation in a horizontal plane and engageable at their peripheries with the heads 12 of the fasteners 10.

The wheels 32 and 34, as best illustrated in FIG. 5 are provided with soft compressible rims or tires 37 which are engageable with the hexagonal heads of a plurality of fasteners for a substantial distance along the line of advance. Since the portions of the wheels engaging the bolts are moving in opposite directions as illustrated by the arrows they positively rotate or spin the fasteners about the axes by rates determined by the speed of rotation and diameter of the wheels.

In addition the speed of rotation of the wheel 34, which is in the direction of advance of the fasteners to the right in FIG. 4 exceeds the speed of rotation of the wheel 32 so that while engaged between the opposing wheels 32, 34, the fasteners are advanced through the particle application zone 30 at a speed slightly in excess of the speed of advance of the belts 20, 22. Accordingly, while the hexagonal heads of the bolts may be in abutment as they enter the application zone, they are separated during the traverse of the zone sufficient to permit independent rotation of the hexagonal heads without interference.

At the application zone 30 nozzles 38 are provided at one or both sides of the line of advance of the fasteners. Conveniently the nozzles 38 may comprise tubular portions 40 having flattened ends 42 which provide elongated ports through which the thermoplastic particles are directed in a generally diverging fan-shaped spray against the sides of the fasteners.

As previously stated, the longitudinal dimension of the application zone as determined by the configuration and angular position of the nozzles 38, and the speeds of rotation of the wheels 32 and 34 are selected such that the deposit 16 of fluid material is built up in successive applications of powdered material so that successive applications of powdered material are onto previously fused portions of the deposit.

With this arrangement it is found that satisfactory fused deposits may be produced on threaded fasteners whose initial temperature at the beginning of application of the particles is substantially below what was previously found to be required where the deposits were essentially the result of a single application of particles of thermoplastic material.

As described above it is found that the benefits of the improved method of deposition in accordance with the present invention require that the entire depositions extend completely around the threaded shank, and preferable comprise at least two successive applications of the particles of thermoplastic material.

In a specific example of the present invention, the deposition was made intermediate the ends of the threaded portion of bolts having a thread diameter of 0.250 inches. The particles of thermoplastic material were supplied by opposed nozzles at opposite sides of the line of advance of the fasteners having a dimension longitudinal of the line of advance of approximately one-half inch. The rate of advance of the fasteners through the application zone was ten feet per minute, which causes the individual fasteners to traverse the application zone in 0.50 seconds. The rate of rotation of spin of the individual fasteners as they traverse the application zone was 90 rpm. This results in 1.5 revolutions of the fasteners as they traverse the application zone, and with two opposed nozzles, produces a total deposition built up by approximately three successive applications of the thermoplastic particles.

Since substantially only axial flow of the displaced friction material is possible, the construction diagrammatically illustrated in FIG. 6 is useful. Here, the annular 360° deposits of resin are applied in a plurality of axially separated bands. The threaded shank 50 is seen to have three annular bands indicated at 52, 54 and 56. The spaces 58 between adjacent bands provide spaces into which friction material may be displaced axially with a minimum distance of displacement. This is important because minimum displacement provides for elastic return flow, which provides the ability of the fastener to be removed and replaced several times while retaining the frictional opposition to flow.

It will be understood of course that the showing of FIG. 6 is only diagrammatic. In practice the bands 52, 54 and 56 may be spaced apart by the bands 58 in which the deposit is substantially thinner than in the bands 52, 54 and 58. This result can be achieved by applying the powder through a slot which is elongated axially of the fastener, and providing thin wires or the like across the slot to at least concentrate the flow to the desired zones.

Referring now to FIG. 7 there is illustrated a further embodiment of the invention. Here the fastener shank 60 has a 360° band or ring of friction material applied primarily to the sides of the thread convolution in the band at the non-load bearing side thereof. In the figure, the resin is seen at 62 applied to the non-load bearing sides of threads, the load bearing sides 66 being shown as substantially devoid of friction material. In practice of course, where the deposits are built up by powder deposition, the load bearing surfaces 66 may receive a limited amount of material, insignificant as compared to the deposit on the non-load bearing surfaces on which the deposits 62 are applied.

In FIG. 8 there is illustrated apparatus for producing the fasteners of FIG. 7. Here the fastener shank 60, extending down from the head 68, has threads 64 having surfaces 66 which are under axial loading when the fasteners is engaged with a mating female fastener. The fasteners are heated as seen in FIG. 2, and the resin powder is directed upwardly by passages 70 provided in a nozzle head 72. Passages 70 may be nearly parallel to load bearing surfaces 66, or even at a greater angle so that little or no powder is applied directly to the bottom of the thread grooves. By controlling orifice size, rate of flow, fastener advance and rotation, and fastener temperature, the degree to which deposition may be limited to the non-load bearing thread surfaces may be determined.

With this arrangement, the fasteners engage initially with the load bearing thread surfaces in metal-to-metal contact, and flow or displacement of friction material is minimized, while still providing adequate resistance to loosening.

While the friction material is applied as separate particles of thermoplastic resin, the temperature of the threaded article on which the particles are deposited is sufficient to cause the particles to fuse into a solid continuous mass in each thread groove, and to become fuse bonded to the adjacent thread surface. It is of course appreciated that continuity of the deposit applies only to the material in each thread groove convolution.

It is desired to emphasize that where reference is made to a substantially uniform thickness of the deposit of friction material on the thread surface as measured perpendicular thereto over the major portion of the thread surface from adjacent the root to adjacent the crest of the thread, this intended to differentiate sharply from the shape of deposit which has become familiar in the formation of localized patches of limited circumferential extent, in which the deposit fills a substantial part of the thread groove and has a great variation in thickness as measured as described. It will also be apparent that in the embodiment of the invention illustrated diagrammatically in FIG. 6, the thickness of the deposit on the thread surfaces varies axially from bands 52, 54 and 57, where it is of maximum thickness, to the intervening annular zones 58, where it is of minimum or even negligible thickness.

FIG. 9 suggests a modification of nozzle which will produce this type of deposit. Nozzle 80 has a vertically elongated outlet port 82 traversed by one or more wires 84 which serve to separate the particles into vertically separated streams. As the fastener is positively rotated as above described, the particles form the axially separated rings or bands 52, 54 and 56. While there may be a small amount of material deposited in the zone or zones 58, it is negligible.

The reduction in temperature of the fastener required in the annular deposit extending around the fastener is a very important feature of the present invention. Unfortunately there is no practical way of measuring this temperature, besides which it will vary with the dimensions of the fastener. Accordingly, the minimum temperature for any particular operation must be arrived at empirically. Once determined, however, the conditions which produce the most efficient results will be a matter of record and can readily be repeated.

It is emphasized that this procedure not only avoids the use of temperatures sufficiently high to injure fasteners, such for example as specially treated fasteners, but also represents a substantial saving in the energy required to heat the fasteners.

It will be noted that certain aspects of the method disclosed herein are useful in the application of friction material which does not require fusion.

I claim:

1. The method of making locking fasteners which comprises advancing a series of headed threaded fasteners on a pair of parallel belts spaced to support the fasteners with the heads thereof on the belts and with the threaded shanks extending downwardly below the belts, defining an application zone by providing nozzle means at the side of the path of advance of the threaded shanks, heating the fasteners prior to entry into the application zone to a temperature sufficient to fuse thermoplastic resin particles received on the shanks, applying a stream of thermoplastic resin particles through said nozzle means onto the shanks as they traverse the application zone, positively rotating the fasteners as they traverse the application zone at a rate sufficient to form an annular deposit of fused resin extending completely around the shanks of the fasteners and directing the stream of particles against the sides of the fasteners at an oblique angle to the axes thereof such that the deposit of friction material is primarily at the non-load bearing sides of the threads.

2. The method defined in claim 1, which comprises providing a plurality of vertically separated but closely adjacent streams of particles onto the fasteners as they traverse the application zone to provide axially spaced bands of friction material on the fasteners.

3. The method of making locking fasteners which comprises advancing a series of headed threaded fasteners through a heating zone comprising inducation heating means toward an application zone on a pair of spaced parallel supports spaced to support the fasteners with the heads thereof on the supports, with the threaded shanks extending downwardly below the supports and with the heads of adjacent fasteners in contact with each other, defining an application zone by providing means at one side of the path of advance of the fasteners for applying a fluid friction material thereto as they advance through the application zone, gripping the heads of individual fasteners as they enter the application zone, positively rotating the fasteners and advancing the fasteners at an accelerated rate to provide a separation between the heads of adjacent fasteners, and applying a fluid friction material to the shanks of the fasteners as they traverse the zone.

4. The method defined in claim 3, which comprises rotating the fasteners in the application zone at a rate to provide a deposit made up of a plurality of sequential applications.

5. The method of treating headed externally threaded fasteners to provide deposits of thermoplastic friction material extending completely around the fasteners in annular friction zones intermediate the ends of the threaded portions thereof and located primarily within the thread grooves thereof, in which the deposits extend radially from the bottoms of the thread grooves a distance which is a small fraction of the full depth of thread groove, which comprises advancing a series of fasteners horizontally suspending them by the heads between laterally spaced moving flexible belts with the threaded shanks of the fasteners extending vertically below the belts through a heating zone in which the threaded shanks are heated to above the fusion temperature of the thermoplastic material, advancing the fasteners through a particle application zone between a pair of rotating wheels having yielding peripheries and occupying the plane of the heads of the fasteners to impart a spin to the fasteners relative to the belts as they traverse the particle application zone, directing a stream of thermoplastic particles against the sides of the shanks of the fasteners as they traverse the application zone, and relating the rate of advance of the fasteners through the application zone, the rate of spin to the dimensions of the zone, in the direction of the advance of the fasteners, and the quantity of material applied to the fasteners to cause the deposits of particles to extend completely around the fasteners to form annular friction zone in which the mid-portion of the resin deposit has a radial depth which is a small fraction of the full depth of the thread groove.

6. The method defined in claim 5, in which the radial depth of deposit is 5–15% of the full depth of the thread groove.

7. The method defined in claim 5, in which the deposit covers at least one side wall of the thread grooves substantially to the crests of adjacent threads, but not extending beyond the thread crests.

8. The method defined in claim 5, which comprises correlating the speed of traverse and rotation of the fasteners such that the band of friction material is formed by at least two successive applications.

9. The method defined in claim 5, which comprises correlating the speed of traverse and rotation of the fasteners with the rate of feed of the particles such that throughout the major portion of the thread surface the thickness of the deposit measured perpendicular to the surface from adjacent the root to adjacent the crest is substantially uniform.

10. The method defined in claim 9, and in which the thickness of the deposit is such that the temperature of the fasteners as they enter the application zone is reduced substantially below that required to fuse a heavy deposit required when the deposit is of limited circumferential extent at one side of the fastener.

11. The method defined in claim 5 in which the heating zone comprises induction heating means, which comprises advancing the fasteners through the heating zone in a solid array on the belts with the heads in contact, and advancing the fasteners through the application zone at an accelerated rate as they are rotated in the application zone to provide a separation between the heads of adjacent fasteners.

* * * * *